(12) United States Patent
Davis et al.

(10) Patent No.: US 6,343,669 B2
(45) Date of Patent: *Feb. 5, 2002

(54) ATV WITH VERTICAL CRANKSHAFT ENGINE

(75) Inventors: Richard A. Davis; Eric A. Davis, both of Mequon, WI (US)

(73) Assignee: Odyssey Manufacturing, LLC, Mequon, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,264

(22) Filed: Dec. 21, 1998

(51) Int. Cl.[7] .............................................. B60K 17/22
(52) U.S. Cl. .......................... 180/376; 180/21; 180/291
(58) Field of Search ........................ 180/21, 233, 251, 180/291, 374, 375, 376, 337

(56) References Cited

U.S. PATENT DOCUMENTS

| | | | | |
|---|---|---|---|---|
| 2,879,859 A | * | 3/1959 | Swisher | 180/21 |
| 3,613,815 A | * | 10/1971 | Meylink | 180/291 |
| 4,666,015 A | * | 5/1987 | Matsuda et al. | 180/251 X |
| 4,699,234 A | * | 10/1987 | Shinozaki et al. | 180/251 X |
| 4,836,324 A | * | 6/1989 | Morita et al. | 180/291 |
| 5,036,939 A | | 8/1991 | Johnson et al. | |
| 5,467,839 A | | 11/1995 | Yoshio | |
| 5,699,872 A | * | 12/1997 | Miyakawa et al. | 180/291 |
| 5,791,431 A | | 8/1998 | Asao et al. | |
| 6,182,784 B1 | | 2/2001 | Pestotnik | |

* cited by examiner

Primary Examiner—Eric Culbreth
Assistant Examiner—F. Zeender
(74) Attorney, Agent, or Firm—Andrus, Sceales, Starke & Sawall, LLP

(57) ABSTRACT

An ATV (10), all terrain vehicle, having staddle seating (12) and at least four oversized balloon tires (14, 16, 18, 20), and a frame (22) having front and rear suspensions (28, 30) respectively mounting the tires, has an engine (32) mounted on the frame (22) between left and right frame rails (24, 26), and having a vertical crankshaft (34).

1 Claim, 6 Drawing Sheets

ATV WITH VERTICAL CRANKSHAFT ENGINE

BACKGROUND AND SUMMARY

The invention relates to ATVs, all terrain vehicles, and more particularly to improvements enabling manufacturing cost advantages.

ATVs are known in the art, and have grown in popularity, not only for recreational but also for various functional purposes. An ATV has a straddle seat, and at least four oversized balloon tires, to overcome prior objections to three wheel ATVs. The ATV has a frame with front and rear suspensions respectively mounting the large tires and allowing sufficient travel to accommodate rough terrain.

The present invention provides a packaging construction providing a manufacturing cost advantage by enabling the use of a mass-produced economical industrial engine in an ATV. In the present ATV configuration, a vertical crankshaft engine is used, which in turn enables usage of the noted mass-produced economical industrial vertical crankshaft engine, such as produced by mass manufacturers such as Kohler, Briggs and Stratton, Tecumseh, and the like. The invention enables usage of two cycle or four cycle engines, air cooled or water cooled.

The vertical crankshaft engine in an ATV further enables positioning of the cooling air inlet high on the vehicle, minimizing intrusion of water into the cooling system. Another advantage is that the power take-off shaft can be neatly packaged below the vehicle, maximizing operator safety. Power take-off devices can be attached in a maximally effective plane, namely horizontal. The vertical crankshaft in combination with various power take-off devices, such as pulleys, constant velocity, CV, transmissions, or gear drives can be utilized while maximizing packaging efficiency. In a further aspect, the engine fits between the frame rails of the ATV, allowing a narrower package, and minimizing vibration propagation.

DETAILED DESCRIPTION OF THE INVENTION

Figure 1:
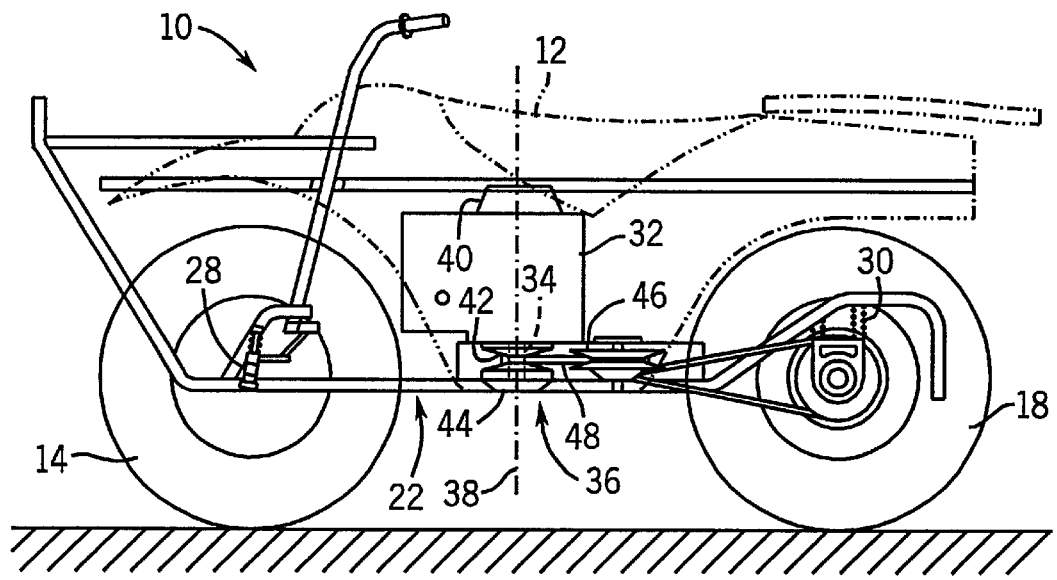
FIG. 1 is a side schematic elevation view of an ATV constructed in accordance with the invention.

FIG. 1 shows an ATV 10, all terrain vehicle, having straddle seating at seat 12, i.e. the operator sits on seat 12, with his/her legs staddling same. The ATV includes at least four oversized balloon tires 14, 16, 18, 20, FIGS. 1 and 2. The ATV includes a frame 22 with left and right side rails 24, 26, and front and rear suspensions 28, 30 respectively mounting the tires. An engine 32 is mounted on the frame between the left and right side rails and between the front and rear suspension and has a vertical crankshaft 34. Engine 32 is preferably purchased from a mass manufacturer such as Kohler, Briggs and Stratton, Tecumseh, or the like, and typically ranges from 3 to 22 horsepower.

ATV 10 includes a lower power take-off drive member 36 below the engine and rotating in a horizontal plane about a vertical axis 38. Engine 32 has an upper cooling air inlet 40 above the axes of rotation of the tires, and preferably at or above the tops of the tires. Power take-off drive member 36 includes a primary pulley 42 at the lower end of vertical crankshaft 34. A constant velocity clutch 44 is provided for engaging and disengaging the pulley. Pulley 46 is driven by pulley 42, and each pulley rotates in a coplanar horizontal plane. Pulley 46 is spaced below straddle seat 12 and vertically aligned therewith. Each pulley 42 and 46 is preferably at a level at or below the axes of rotation of the tires. Primary pulley 42 drives secondary pulley 46 by coplanar drive belt 48. Pulley 46 drives rear wheel tires 18 and 20 by V-belt 50 driving pulley 52 on rear axle 54. Axle 54 is a live axle, and ATV 10 is a two wheel drive vehicle. Front wheels 14 and 16 are connected by live axle 55. The vehicle is braked by disc brake 56 actuated by cable 58 from foot brake pedal 60 on foot rest 62. The brake may also be actuated from left foot rest 64.

Figure 2:
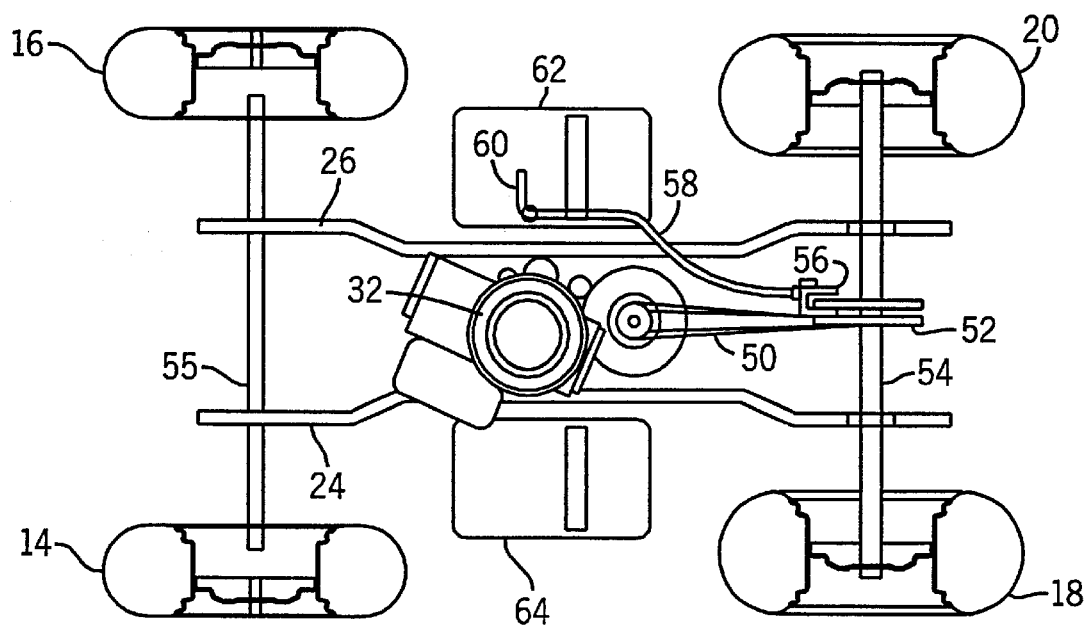
FIG. 2 is a top schematic elevation view of the ATV of FIG. 1.
Figure 3:
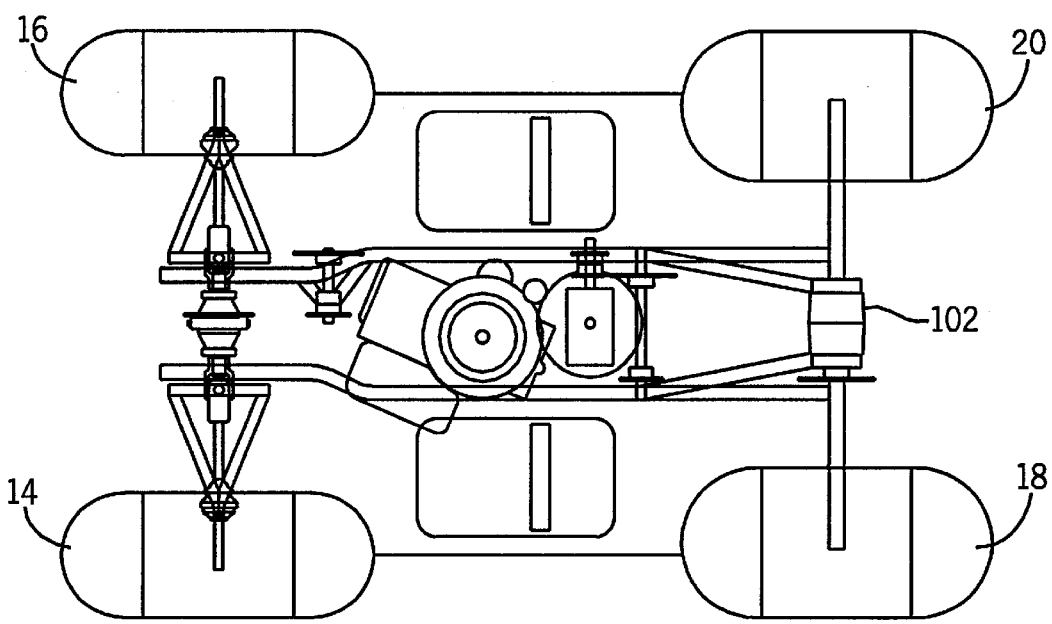
FIG. 3 is a view like FIG. 2 and shows an alternate embodiment.
Figure 4:
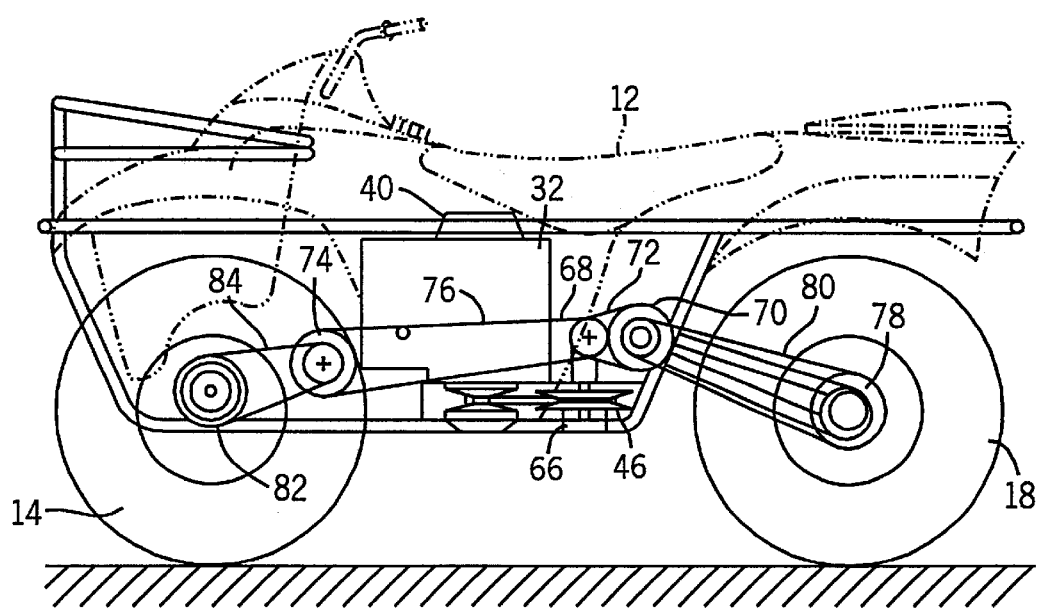
FIG. 4 is a side schematic elevation view of the ATV of FIG. 3.
Figure 5:
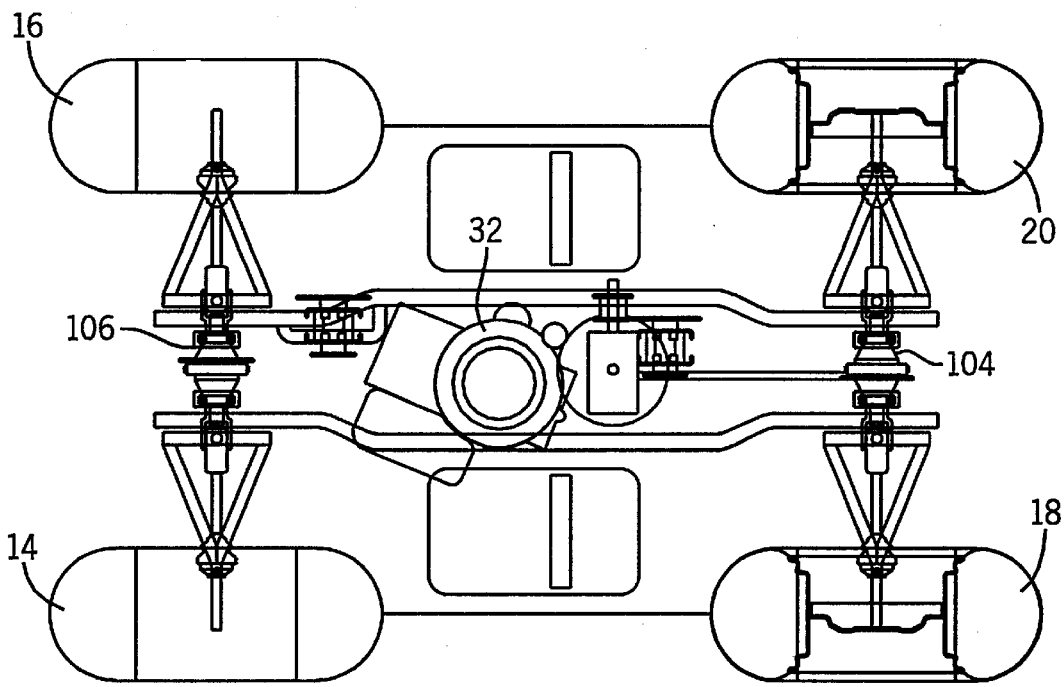
FIG. 5 is a view like FIG. 3 and shows an alternate embodiment.
Figure 6:
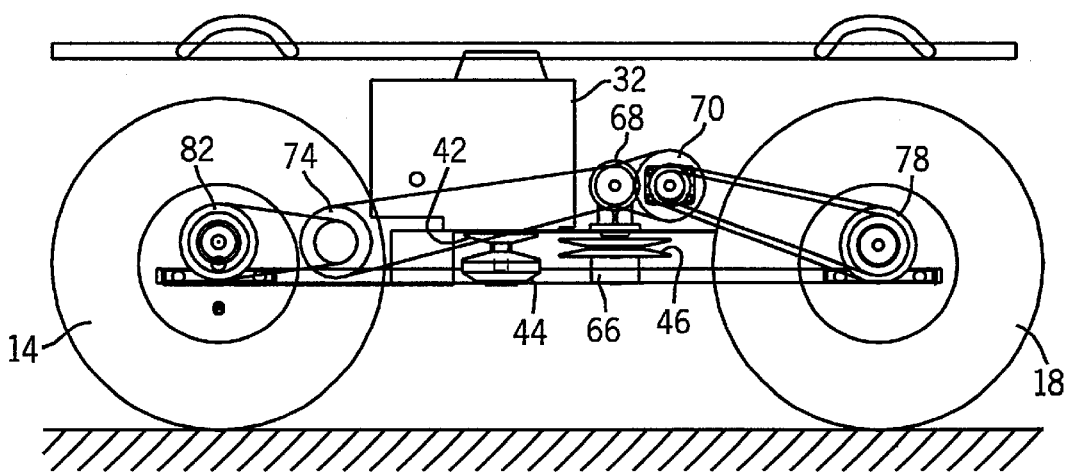
FIG. 6 is a side schematic elevation view of the ATV of FIG. 5.
Figure 7:
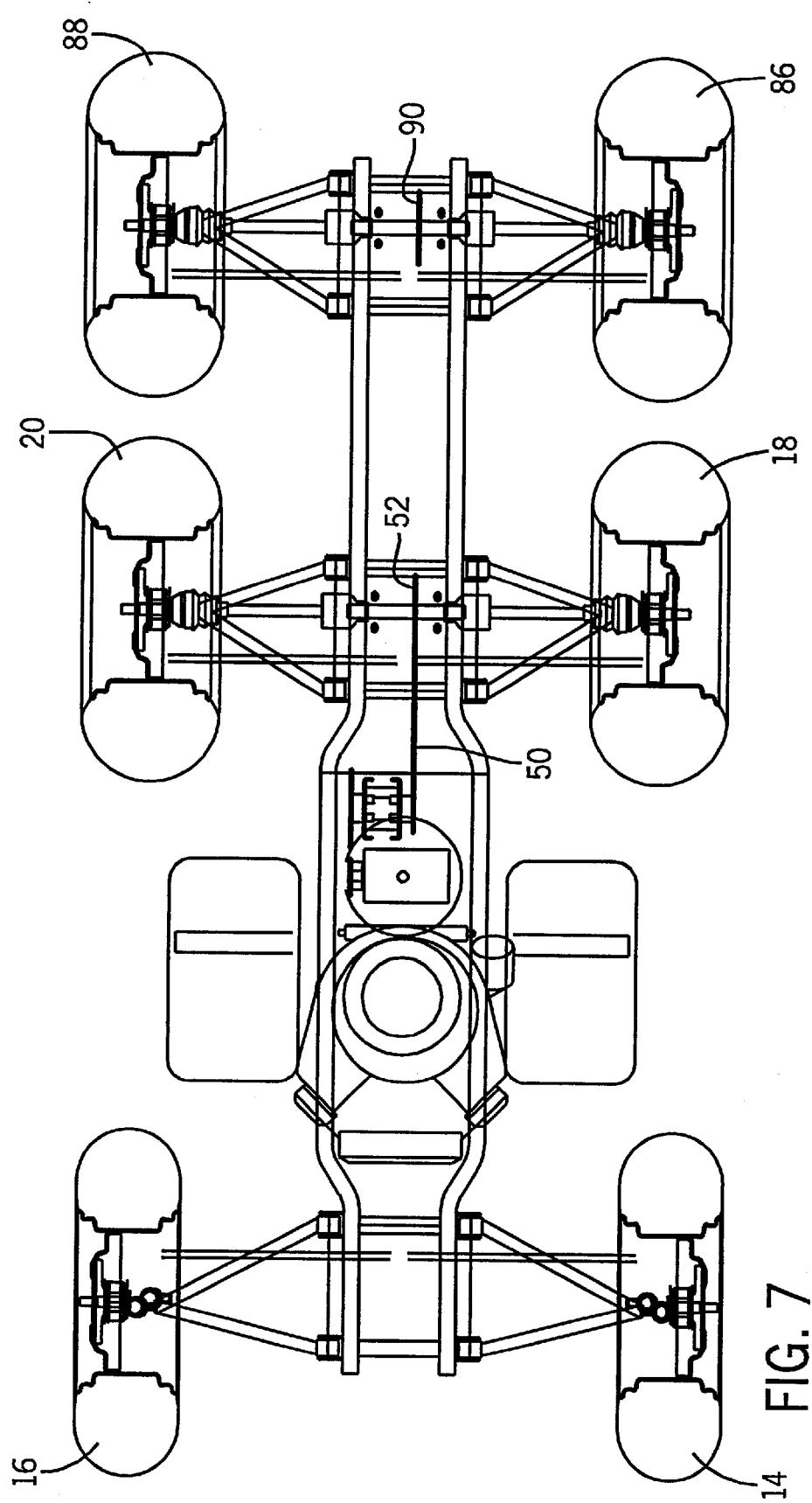
FIG. 7 is a view like FIG. 5 and shows an alternate embodiment.
Figure 8:
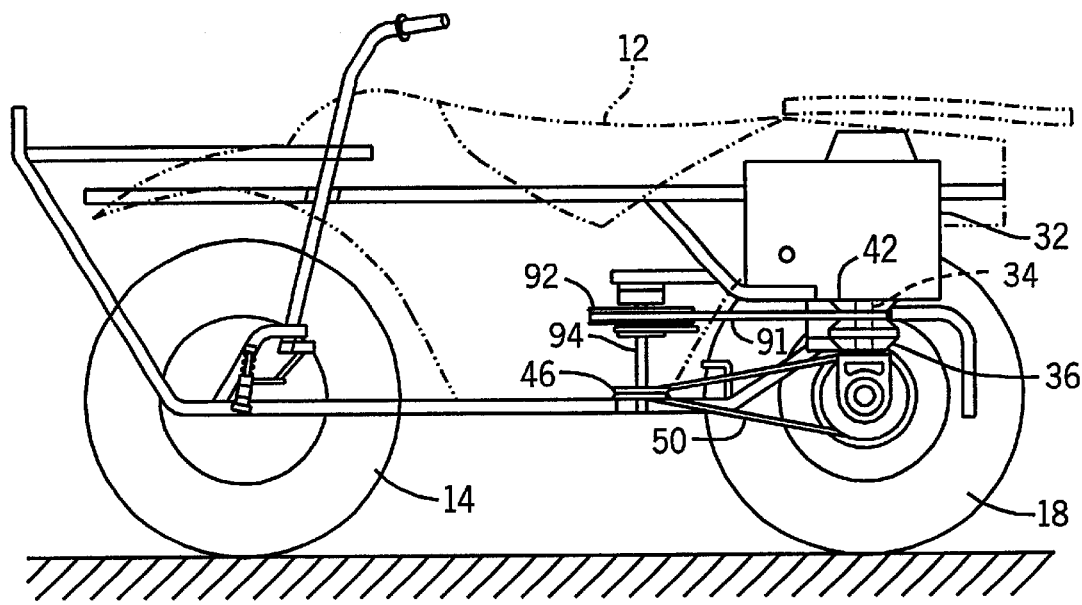
FIG. 8 is a view like FIG. 1 and shows an alternate embodiment.
Figure 9:
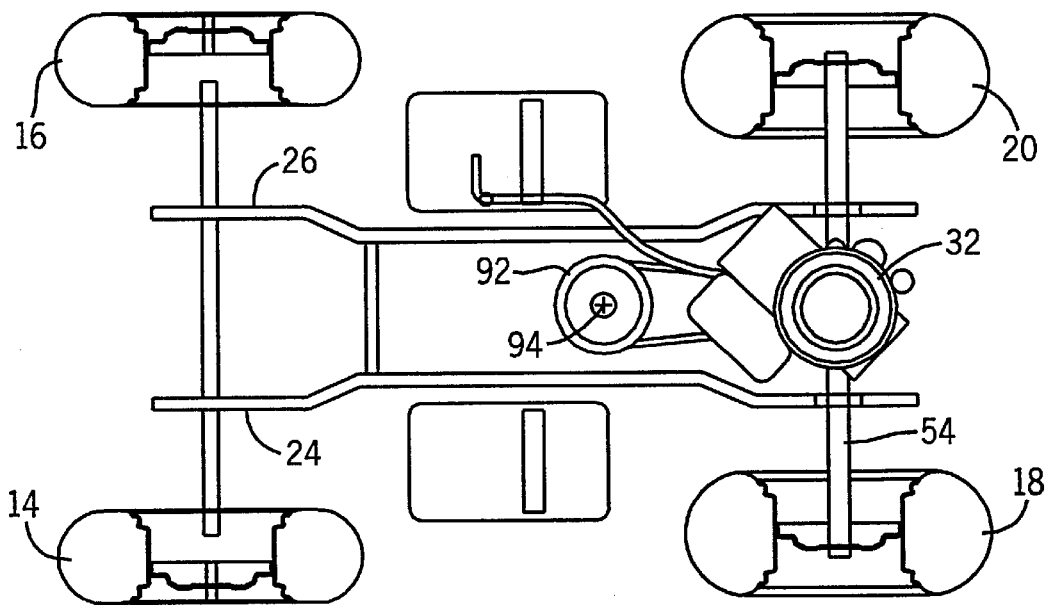
FIG. 9 is a top schematic elevation view of the ATV of FIG. 8.
Figure 10:
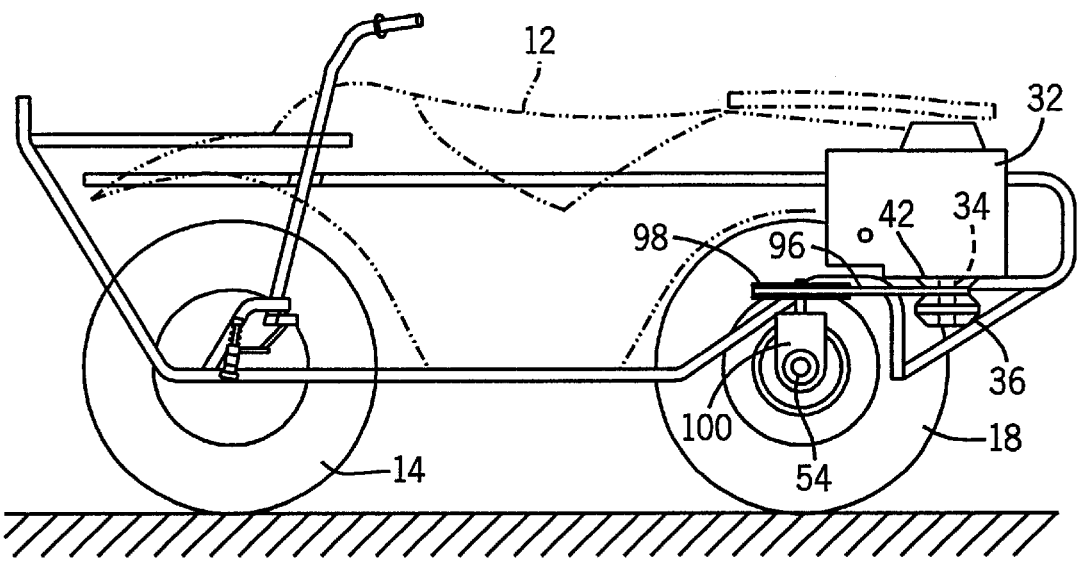
FIG. 10 is a view like FIG. 1 and shows an alternate embodiment.
Figure 11:
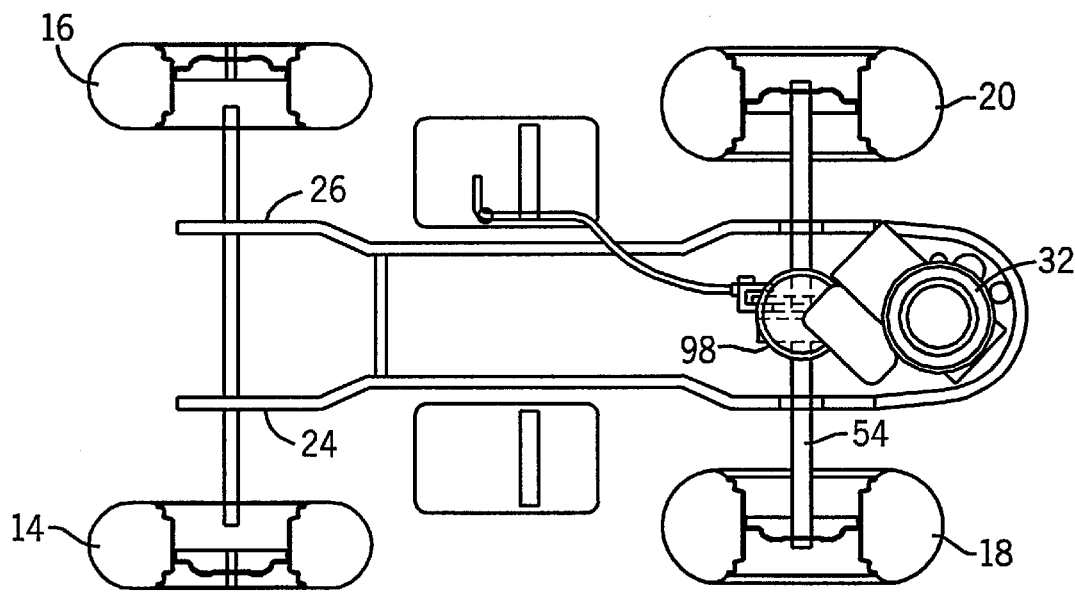
FIG. 11 is a top schematic elevation view of the ATV of FIG. 10.

FIGS. 3 and 4 are similar to FIGS. 1 and 2 and show how the present invention enables a four wheel drive ATV, with a live rear axle and independently suspended front wheels. Secondary pulley 46 drives a 90° transmission 66, which is known in the art, which in turn drives pulley 68 which drives pulley 70 via belt 72 and which drives pulley 74 via belt 76. Pulley 70 drives rear transmission 78 via belt 80, to in turn drive rear wheel tires 18, 20. Pulley 74 drives front transmission 82 via belt 84 to drive front wheel tires 14, 16. FIGS. 5 and 6 illustrate how the invention enables a four wheel ATV with independent rear wheels and independent front wheels. FIG. 7 illustrates how the invention further enables a six wheel ATV, with additional rear wheel tires 86, 88. If these latter wheels are also to be drive wheels, then an additional drive belt is connected from pulley 52 or 78 to rear pulley 90 or a transmission. If a six wheel drive vehicle is desired, then an additional front drive pulley and belt are provided, as in FIGS. 3–6. FIGS. 8 and 9 show an ATV similar to that of FIGS. 1 and 2, but with engine 32 and its vertical crankshaft 34 directly over rear axle 54, wherein power take-off drive member 36 and primary pulley 42 driving drive belt 91 to drive pulley 92 on vertical shaft 94 which drives pulley 46 which drives rear wheel tires 18 and 20 by V-belt 50 as above. FIGS. 10 and 11 show an ATV similar to FIGS. 1 and 2, but with engine 32 and its vertical crankshaft 34 rearward of rear axle 54, with power take-off drive member 36 and primary pulley 42 driving drive belt 96 to drive pulley 98 driving a 90° transmission 100 to drive rear axle 54. In various embodiments, two drive wheels may be connected and driven through a differential, for example, 102, FIG. 3, 104, 106, FIG. 6.

It is recognized that various equivalents, alternatives and modifications are possible within the scope of the appended claims.

What is claimed is:

1. An ATV, all terrain vehicle, for off-road conditions including traversing snow, gravel, shallow rivers, boulders, potholes, curbs, tree trunks, logs, and abrupt transitions, said ATV having straddle seating, at least four tires, and handlebar steering control, comprising a frame having front and rear yieldable suspensions respectively mounting said tires and having springing and damping properties provided by components other than said tires, an engine mounted on said frame and having a vertical crankshaft, the ATV having a ground clearance substantially equal to the radius of said tires, said tires comprising a front pair of tires rotating about a front horizontal axis, and a rear pair of tires rotating about a rear horizontal axis, a lower power take-off drive member below said engine and rotating in a horizontal plane substantially coplanar with said front and rear horizontal axes of said front and rear tires, comprising a first pulley at the lower end of said vertical crankshaft, a constant velocity clutch engaging and disengaging said first pulley, and a second pulley driven by said first pulley, each said pulley rotating in said horizontal plane substantially coplanar with said front and rear axes.

* * * * *